United States Patent Office 3,578,659
Patented May 11, 1971

3,578,659
18-NOR-14β-PREGNANO-[13,14-f]-HEXAHYDRO-1,4-OXAZEPINES
Hans-Detlef Berndt, Berlin, Germany; Paul Buchschacher, Arlesheim, Switzerland, Ulrich Eder, Berlin, Germany, Andre Furlenmeier and Andor Furst, Basel, Switzerland, Ulrich Kerb, Berlin, Germany, Marcel Muller, Frenkendorf, Switzerland, and Rudolf Wiechert, Berlin, Germany, assignors to Hoffmann-La Roche Inc., Nutley, N.J.
No Drawing. Filed Mar. 28, 1969, Ser. No. 811,626
Claims priority, application Germany, Apr. 6, 1968, P 17 68 162.8
Int. Cl. C07c *173/00*
U.S. Cl. 260—239.55     28 Claims

ABSTRACT OF THE DISCLOSURE

18 - nor - 14β - pregnano-[13,14-f] - hexahydro - 1,4-oxazepines and methods for their preparation are described. These compounds are valuable pharmaceuticals in that they exhibit blood pressure reducing and diuretic effects. They also possess a positive inotrope and myotrope activity, promote the blood flow to blood vessels surrounding the heart and also the stroke minute volume of the heart.

BRIEF DESCRIPTION OF THE INVENTION

The present invention relates to novel 18-nor-14β-pregnano - [13,14-f] - hexahydro - 1,4 - oxazepines of the partial formula

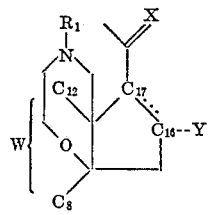

(I)

wherein X is a keto group or

wherein

has the α- or β-configuration and $R_2$ is hydrogen, acyl, alkyl, or tetrahydropyranyl, $R_1$ is hydrogen, alkyl, alkenyl, alkynyl or acyl, $C_{16} \ldots C_{17}$ represents a saturated or unsaturated carbon-carbon bond, Y is hydrogen, alkyl, or —$OR_3$ wherein $R_3$ is hydrogen, acyl, alkyl, or tetrahydropyranyl, W is the remainder of the steroid molecule which may contain substituents in rings A, B and/or C, and the ammonium salts thereof.

The remainder of the steroid molecule W may be substituted in rings A, B and /or C with groups which are either uncombined or functionally modified, preferably esterified hydroxy groups in the 1-, 3-, 7-, 9- and 11-positions, keto groups in the 3-, 6-, 7- or 11-positions, epoxy rings, especially in the 9,11-position, halogen atoms, especially chloro or fluoro in the 6- and 9-positions and preferably lower alkyl groups in the 1-, 2-, 6-, or 7-positions. If ring A and ring B are joined in a cis configuration, then simultaneously present 3-keto and 9α-hydroxy groups may be bound to one another through a semiacetal bond. Additionally, the steroid, moiety W may contain additional double bonds in the 1,2-, 4,5-, 5,6-, 6,7-, 7,8- or 9,11-positions.

Preferred steroid moiety W can be represented by the following

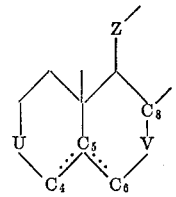

wherein U is the group

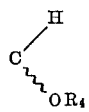

where —$OR_4$ has the α- or β-configuration and $R_4$ is hydrogen, acyl, alkyl or tetrahydropyranyl or alternatively U may be C=O wherein the keto group may be in the ketal form, $C_4 \ldots C_5$ as well as $C_5 \ldots C_6$ are saturated or unsaturated carbon-carbon bonds in the indicated positions, $V \ldots C_8$ is selected from one of the following groups

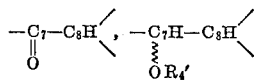

(where OR'$_4$ has the same meaning as —$OR_4$) or —$C_7$=$C_8$<, and Z is the group

(where —$OR_5$ is α- or β- in configuration and $R_5$ hydrogen or acyl) or C=O and the hydrogen atoms in the 5-position is in the α- or β-configuration.

As used herein the term "alkyl" comprehends hydrocarbon radicals which may be straight or branched chain and which in most preferable embodiments encompasses "lower alkyl" groups having from 1 to 7, most preferably 1 to 4 carbon atoms. The lower alkyl groups are preferred substituents in the compounds of the present invention, notwithstanding whether they are bound to the C—, O— or N— atoms. Examples of suitable lower alkyl groups include methyl, ethyl and propyl groups. Included within the scope of lower alkyl groups herein are those lower alkyl groups substituted in the usual manner such as for example a benzyl group.

If the alkyl group is part of an ether group, this alkyl group may contain therein an aditional oxygen atom. Examples of preferred ether groups of this type include the —$OCH_2OCH_3$ or —$OC_2H_4OCH_3$ groups.

As specific $R_1$ substituents one may include also for example, the isopropyl, tertiary butyl, propenyl, isopropenyl, methallyl, vinyl, alkyl or ethynyl groups.

The acyl groups in the compounds of the present invention are derived from carboxylic acids which are known in the steroid chemistry art to be useful in the esterification of free hydroxyl groups. They may be straight chained or branched chained, saturated or unsaturated, or mono or poly basic. Especially preferred are acyl groups from carboxylic acids having from 1 to 11 carbon atoms.

Examples of suitable carboxylic acids include formic acid, acetic acid, propionic acid, caprionic acid, enanthic acid, undecyl acid, chloroacetic acid, hydroxyacetic acid, aminoaetic acid, diethyl acetic acid, trimethyl acetic acid, tertiary butyl acetic acid, cyclopentyl propionic acid, cyclohexyl acetic acid, phenyl acetic acid, benzoic acid, succinic acid, among others.

The compounds of the present invention exhibit valuable pharmacological activity. They effect the lowering of blood pressure and are diuretics, they exhibit a positive inotrope and myotrope activity and enhance the flow of blood to vessels surrounding the heart as well as increasing the heart stroke minute volume.

In medicinal use, the compounds of the present invention may be especially employed in cases of heart insufficiency. These compounds may be applied parenterally, preferably subcutaneously, or also orally, such as for example in the form of tablets, dragees, capsules, emulsions, etc.

In a process aspect of the present invention, compounds of Formula I may be conveniently prepared by cyclizing a compound of the partial formula

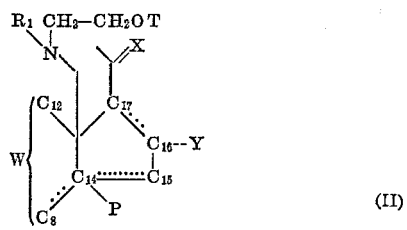

(II)

where $C_{16} \ldots C_{17}$, $R_1$, X, Y and W are as above and T is hydrogen, acyl, sulfonyl or tetrahydropyranyl and either $C_8 \ldots C_{14}$ or $C_{14} \ldots C_{15}$ is an unsaturated carbon-carbon bond and, when $C_8 \ldots C_{14} \ldots C_{15}$ are saturated carbon-carbon bonds, P is an $\alpha$- or $\beta$-hydroxyl group.

The aforesaid cyclization reaction is conducted in an inert organic solvent and in the presence of a cyclization reagent. The reaction conditions employed include a temperature from about room temperature to the reflux temperature of the reaction medium to thereby yield a [13,14-f]-hexahydro-1,4-oxazepine ring.

In further optional steps it is possible in a manner known to the art to hydrolyze functional derivatives of hydroxyl or keto groups, to esterify or etherify free hydroxyl groups or to oxidize such free hydroxyl groups to keto groups, to reduce existing keto groups or carbon-carbon double bonds, to introduce an $R_3OH$ to a present $\Delta^{16}$-double bond, when $C_{16} \ldots C_{17}$ bond is saturated, to epoxify existing double bonds, to introduce into the $9\alpha$ position a chloro or bromo group and/or to convert the primary product into its ammonium salts.

The above described ring closing reaction, wherein a starting material steroid of the pregnane series is converted into a corresponding [13,14-f]-hexahydro-1,4-oxazepine is a novel procedure and is considered part of the present invention.

In order to more readily obtain the preparation of the compounds of the present invention, e.g., novel compounds of Formula I, in that the desired cyclization proceed by selective attack on $C_{14}$, it is necessary that the carbon atom $C_{14}$ be activated in a particular manner. This activation of $C_{14}$ can be attained in various ways and determines essentially the identity of the cyclization reagent. The preferred procedure, especially with regard to a suitable specific cyclization reagent, for the particular starting steroid is dependent on the substituent group on the molecule. The conditions to be used may be determined, if necessary through simple preliminary experiments since the conditions for cyclization reactions are generally known to one skilled in the art.

Should a starting steroid be used wherein there is an existing $C_8 \ldots C_{14}$ or $C_{14} \ldots C_{15}$ double bond, it is necessary that reaction conditions for the ring closing reaction of the present invention be selected which are known to be useful for nucleophilic addition reactions. By the presence of a $\Delta^{14(15)}$-double bond in the starting material the $C_{14}$ carobn atom is activated through an additional $\Delta^{16}$-double bond or preferably through a simultaneously present $\Delta^{16}$-20 keto grouping. Should the starting material contain a $C_8 \ldots C_{14}$ double bond, the activation of the $C_{14}$ carbon atom is obtained by simultaneous presence of a 7-position keto group. The $C_{14}$ activation of a $\Delta^{8(14)}$-starting steroid can also be obtained by the presence of a 7-position bromo atom or an acyloxy group such as for example an acetoxy group. If in the starting material of the present invention there is a $C_8 \ldots C_{14} \ldots C_{15}$ which is a saturated carbon chain, then the activation of the $C_{14}$ carbon atom can be produced by having P preferably as a free or alternatively as an esterified hydroxyl group. The desired ring closing can then be produced by treating the starting material steroid with a dehydrating reagent.

Preferred embodiments in the process aspects of the present invention wherein compounds of Formula I are produced can be summarized as follows:

(a) Treating a pregnane derivative of the formula

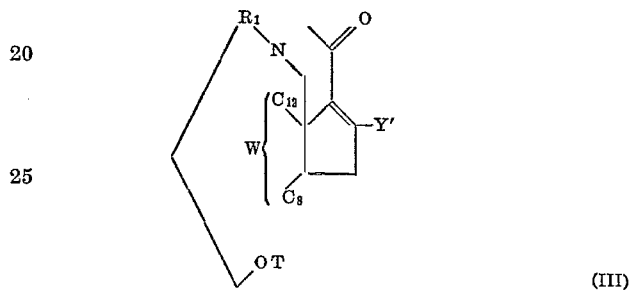

(III)

wherein R and W are as above, T is hydrogen, acyl or sulfonyl and Y' is hydrogen or preferably lower alkyl with base in the presence of an organic solvent at a reaction temperature in the range of from about 0° C. to the reflux temperature of the reaction medium, (b) Cyclizing a pregnane derivative of the formula

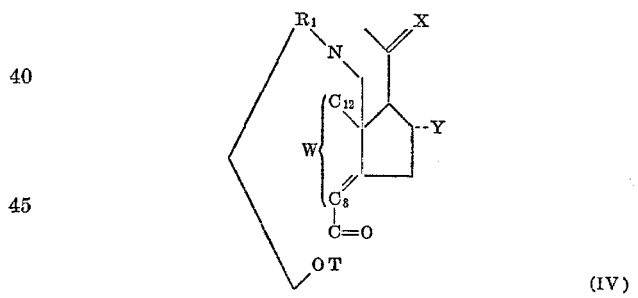

(IV)

wherein $R_1$, T, X and Y are as above and W' is the W corresponding to the indicated steroid group, in an organic solvent and in the presence of base at a reaction temperature between about 0° C. and the reflux temperature of the reaction medium, (c) treating a pregnane derivative of the formula

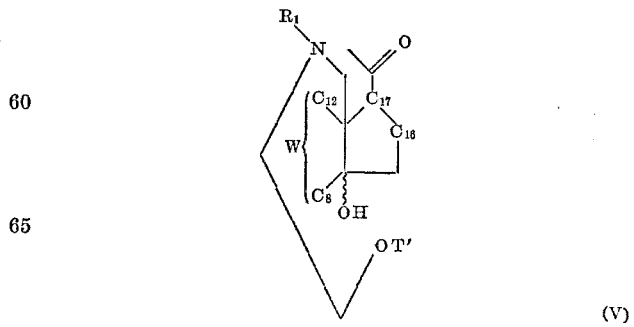

(V)

wherein $R_1$ and W are as above and T' is hydrogen or sulfonyl and the 14–OH group has either the $\alpha$- or $\beta$-configuration, with a dehydrating reagent in the presence of a solvent and at a reaction temperature in the range of from about 0° C. to the reflux temperature of the reaction medium, preferably at about room temperature, (d) cyclizing a pregnane derivative of the formula

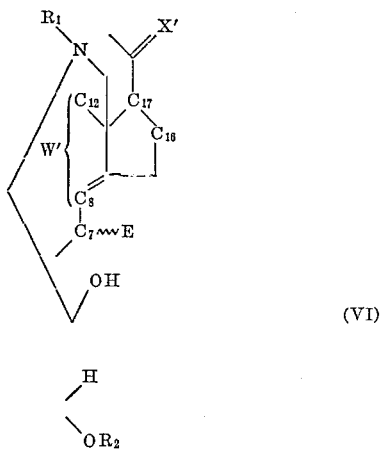

group or a

group wherein $R_2$ is as above and E is bromo or acyl, preferably acetoxy, in a solvent and in the presence of a selected base at a reaction temperature between about 0° C. and about 70° C.

It is understood that it is within the scope of the present invention to optionally utilize additional process steps in a manner known to the art to hydrolyze functional derivatives of hydroxy or keto groups, to esterify or etherify free hydroxy groups or to convert such free hydroxy groups to keto groups by oxidation, to reduce keto groups or carbon-carbon double bonds, to add to present $\Delta^{16}$-double bonds a $R_3OH$ group, to introduce a $\Delta^{16}$-double bond when $C_{16} \ldots C_{17}$ is saturated, to epoxify existing double bonds, to introduce chloro or bromo atoms into the 9α-position and/or convert the end product into its ammonium salt.

Following procedure (a) for the preparation of compounds of Formula I of the present invention, starting steroids in which the hydroxyl group in the 13-position side chain are present in the free or esterified, e.g., acetoxy, form are dissolved in an organic solvent. Suitable organic solvents include neutral and basic reactive solvents. Examples of neutral reactive solvents include, for example, dioxane, tetrahydrofuran, tertiary butanol, ether, dimethyl sulfoxide, dimethyl formamide, among others. Examples of basic solvents include pyridine, piperidine, lutidine, collidine, triethylamine, among others. These latter materials are able to function both as solvents as well as bases. Bases which may be employed are those which are generally known to be useful in conducting nucleophilic addition reactions. Examples of such bases include alkali hydroxides, alkali carbonates and alkali hydrogen carbonates, such as for example, potassium hydroxide, sodium carbonate or sodium bicarbonate, which may be added to the reaction mixture in powdered or dissolved form. Specific organic basic reagents are especially preferred over the above named bases. Particularly suitable are the salts, preferably the alkali salts of branched chain alcohols, such as for example, potassium tertiary butylate. The reaction may be conducted at a temperature of about 0° C. or also at higher reaction temperatures, such as for example, at the reflux temperature of the reaction medium. A particularly preferred range of temperature is between about 30 to 80° C. In order to determine the end point of the reaction, the reaction course is followed by utilizing thinlayer chromatography.

The cyclization by procedure (b) may be carried out in analogous fashion to that described above for procedure (a).

In following procedure (c) the hydroxyl group on the 13-position side chain may be present in free or esterified form, wherein the ester group is a sulfonyl group. The starting material is dissolved in an organic solvent, such as for example, benzene, toluene, a halogenated hydrocarbon such as ethylene chloride, methylene chloride, carbon tetrachloride, chloroform, among others, and is then treated in a known manner with a dehydrating reagent, such as for example, thionyl chloride, phosphorus oxychloride, perchloric acid, concentrated sulfuric acid, chlorine water, etc., for a long time at room temperature or at higher temperatures, such as for example, the reflux temperature of the reaction medium. In a preferred embodiment the diol is dissolved in an organic base such as pyridine, collidine, piperidine or triethylamine and is treated with a sulfonyl chloride such as for example, p-toluene sulfonyl chloride. Under these reaction conditions the ring closure is accomplished at room temperature.

In following the preparation of compounds of Formula I by procedure (d), it is found that the reaction conditions to be employed are dependent on the identity of the substituent on the $C_7$ carbon atom. If the substituent E is a bromine atom then the basic cyclization may be readily accomplished utilizing very mild reaction conditions. A preferred procedure includes treating the starting material in a lower aliphatic ketone, such as for example, acetone, methyl ethyl ketone or diethyl ketone with a basic reactive silver compound such as for example silver oxide or a silver carbonate at a temperature in the range of from about room temperature to about 40° C. If the substituent E is an acyloxy group, such as for example an acetoxy group, the cyclization reaction is preferably carried out using potassium tertiary butylate in dimethyl sulfoxide, dimethyl formamide or tertiary butanol.

All the above described cyclization reactions, e.g., procedures (a) through (d) can be conducted in the presence of atmospheric oxygen. In order to limit as far as possible the presence of side reactions, it is desirable to conduct these reactions in the absence of atmospheric oxygen and preferably in the presence of an inert gas atmosphere such as for example, nitrogen or argon.

Subsequent to the cyclization reaction it is possible if desired to utilize additional reactions in a manner known to the art.

Where it is necessary to protect intermediates such as in a particular ring closing reaction where the starting material contains a keto group, e.g., a 3- or 20-position keto group, it is preferred that this protective group is prepared by ketalization with ethylene glycol, which protective group may be subsequently removed by hydrolyzation in for example, acetone or methanol in the presence of minor amounts of an acid such as for example, sulfuric acid, hydrochloric acid, paratoluene sulfonic acid or oxalic acid.

The reduction of the present carbon-carbon double bond, such as for example a $\Delta^4$, $\Delta^5$ or $\Delta^{16}$ double bond or a keto group such as for example a 3- or 20-keto group, may be conveniently carried out by catalytic hydrogenation preferably in the presence of a noble metal catalyst, such as for example, platinum or palladium, which if desired, may be supported on an inert carrier, such as for example, platinum oxide or palladium on charcoal or palladium on calcium carbonate. The reduction of a keto group can also be carried out conveniently utilizing a metal hydride, such as for example, sodium borohydride or lithium aluminum hydride.

The supplementary insertion of a carbon-carbon double bond may be carried out utilizing any of the methods which are generally known in the art for this purpose. It is possible for example to utilize a chemical method such as for example bromination followed by dehydrobromination or microbiological methods may also be employed. The subsequent insertion of a $\Delta^{16}$ double bond for example may be carried out by first brominating in the 17α-position, such as for example, by utilizing cuprous bromide at elevated reaction temperatures, and then splitting off HBr in a known manner, such as for example, utilizing lithium carbonate/lithium bromide in dimethyl formamide.

Should it be desired that the last obtained product contain an etherified hydroxyl group in the 16-position, then it is possible to effectuate this in the step following the cyclization by adding in a manner known per se an alcohol, such as methanol or ethanol to a $\Delta^{16}$ double bond. This may be accomplished, for example, by heating the $\Delta^{16}$ compound, preferably in the selected alcohol, such as for example, methanol for ethanol and preferably in the presence of potassium carbonate for a period of 1-5 hours at 40° C. On the other hand an originally present 16-hydroxy, 16-acyloxy, e.g., 16-acetoxy, or a 16-alkoxy, e.g., 16-methoxy group may be converted into a $\Delta^{16}$ double bond by removal of the indicated functional groups. In such a procedure the desired substituted compound is heated such as for example, in anhydrous dioxane in the presence of alkali, preferably sodium hydroxide at the reflux temperature of the reaction mixture.

In a further procedure a preferred lower alkyl group, such as for example a methyl group may be inserted in a manner known per se. Thus, for example, alkylation of the 16-position may be accomplished by treating a molecule containing a $\Delta^{16}$-20 keto group in a known manner with alkyl magnesium halide, such as for example, methyl magnesium halide in the presence of cuprous chloride.

The desired hydrolysis of a functionally bound hydroxyl group such as the saponification of an acyloxy group or the cleavage of the either group, e.g., the cleavage of a tetrahydropyranyl group or the esterification or etherification of free hydroxyl groups may be accomplished by following procedures which are well known in the steroid chemistry art.

The formation of an epoxy ring in the 9, 11- or 16, 17-position of the desired end product or also in the starting materials used in the present process may be accomplished by utilizing procedures for the preparation of epoxy rings which have become generally established in the steroid chemistry art.

For example, such introduction can be accomplished by action of peracids or peroxides on the indicated double bond, such as, for example, the $\Delta^{9,(11)}$ or $\Delta^{16}$ double bond.

The 16, 17-epoxy group, which has been prepared for example by the action of peroxide on the $\Delta^{16}$ double bond, may also be employed as a protective group for the $\Delta^{16}$ double bond in that it is possible to reform the $\Delta^{16}$ double bond by cleaving the epoxy group with chromium (II) salts, particularly with chromium (II) chloride in acetic acid at room temperature. Additionally, the 16, 17 epoxy group may be employed in a further step to yield a $16\alpha$ hydroxyl group, such as for example, by treating the 16, 17-epoxy compound with a chromium (II) salt preferably with chromium (II) acetate in acetic acid at room temperature.

The epoxy groups may also be employed in a further step for the introduction of halogen atoms. In this way it is possible to treat, for example, a 9,11 epoxide with a mineral acid such as hydrochloric or hydrofluoric acid in a known manner to yield the desired 11-hydroxy-$9\alpha$-halo compound.

Should the final desired product contain a $11\beta$-$9\alpha$-bromo or chloro compound, it is possible to prepare such compounds from the aforesaid $\Delta^{9,(11)}$ compound by treating the aforesaid $\Delta^{9,(11)}$ double bond in a manner known per se, such as for example, with an acyl imide, such as N-bromo succinimide or an acylamide such as N-bromo or N-chloro acetamide in acetone, dioxane or tetrahydrofuran.

If it is desired to convert the obtained free base into a salt, this salt formation may be accomplished by any convenient method. In one convenient procedure the base is dissolved in an organic solvent, such as for example, diethyl ether, diisopropyl ether or tetrahydrofuran or mixtures thereof and is treated therein with the desired acid, such as for example, by bubbling through hydrogen chloride gas. Useful salts include, for example, the perchlorate, sulfate, gluconate, citronate as well as salts formed with organic acids such as acetic acid, succinic acid, benzoic acid, salicilic acid, sulfonic acids, such as for example, methane sulfonic acid or paratoluene sulfonic acid. As used herein the term "salt" also encompasses the quaternary ammonium salts. These may be obtained in a known manner such as for example, by treating the aforesaid free base with an alkyl halide, preferably at elevated temperatures in the presence of alcohol as the solvent. The desired salt formation can also be accomplished by utilizing basic ion exchange in the manner known per se.

In the preparation of compounds of the present invention of Formula I, it may be necessary to employ previously unknown starting steroids of the general Formula II. These compounds may be prepared in the following manner. A hydrogen atom of the $13\beta$-position methyl group of the aforesaid steroids in which rings A, B, and C correspond to the substituent W of Formula I can be substituted with a $\beta$-hydroxy ethylamino- or a N-alkyl-$\beta$-hydroxy ethylamino group (the N-alkyl group corresponds to $R_1$). Which of these known procedures may be used in the preparation of specific starting materials of Formula II is essentially dependent on whether the cyclization reaction of the invention is utilized on starting steroids having a $\Delta^{9(14)}$-$\Delta^{14(15)}$-double bond or a 14-hydroxyl group, the method to be used and the manner in which the $C_{14}$ activation direct the ring closing.

Preferred useful starting materials of Formula II include for example:

(A) $3\beta$ - acetoxy - 18-(methyl-2'-acetoxyethylamino)-pregna - 5,16 - diene - 20 - one, and $3\beta$ - acetoxy - 18-(methyl-2'-acetoxyethylamino) - 5,14,16 - pregnatrien-20-one;

(B) $3\alpha,11\alpha$ - diacetoxy - 18 - (methyl-2'-acetoxyethylamino)-$5\beta$-pregna-14,16-dien-20-one;

(C) $3\beta,20\alpha$(and $20\beta$) - dihydroxy-18-(2'-hydroxyethylamino)-$5\alpha$-pregn-8-(14)-en-7-one;

(D) $20\alpha$ - (and $20\beta$)-hydroxy-18-(methyl-2'-hydroxyethylamino)-$5\beta$-pregn-8-(14)-en-3,7-dione, and $20\alpha$-(and $20\beta$) - (2',2',2'-trichloroethylcarbonyloxy) - 18-(2',2',2'-trichloroethoxycarbonyloxyethyl - 2',2',2' - trichloroethoxycarbonyl-amino) - $5\beta$-pregn-8-(14)-en-3,7-dione;

(E) 14 - hydroxy - $3\alpha$-acetoxy-18-(methyl-2'-hydroxyethylamino)-$5\beta$,$14\beta$-pregnan-20-one;

(F) 14 - hydroxy-18-(methyl-2'-hydroxyethylamino)-4-pregnen-3,20-dione;

(G) 18 - (methyl-2'-acetoxyethylamine) - pregna-4,7-dien - 3,20 - dione, and 7-bromo-3,20-bis-ethylenedioxy-18-(methyl-2'-hydroxyethylamino)-pregn-8(14)-ene;

(H) 3,20-bis-ethylenedioxy) - 7 - acetoxy-18-(methyl-2'-hydroxy-ethylamino)-pregn-8(14)-ene.

In order to further clarify the manner in which the starting materials used herein may be prepared the preparation of the above-named starting compounds is described:

(A) The reaction of $3\beta$-acetoxy-pregn-5-en-20-ol with nitrosylchloride in pyridine yields the 20-nitrite ester which is converted photochemically into the 18-oxime derivative. Reduction of the oxime with hydrogen/Raney-nickel, reaction with $\beta$-chloroethyl acetate followed by reaction with formaldehyde/formic acid yields a tertiary amine which is then oxidized with $CrO_3$ in pyridine to give the saturated 20-ketone. Bromination with cupric bromide in methanol yielded the 17-bromo-20-ketone which without isolation is dehydrobrominated. Chromatographic purification on kieselgel yielded $3\beta$-acetoxy-18-(methyl-2'-acetoxyethyl-amino)-pregna-5,16-dien-20-one.

A solution containing 9.42 g. (20 mmol) $3\beta$-acetoxy-18-(methyl-2'-acetoxyethyl-amino) - 5,16-pregnadiene-20-one in 400 ml. of absolute ether and 200 ml. of glacial acetic acid was treated with 15 g. of potassium actate. The mixture was cooled to about 2° C. and with stirring was treated dropwise with a solution containing 3.24 g. (20 m Mol) of bromine in 150 ml. of glacial acetic acid during a period of three and one-half hours. After the addition the stirring was continued for two hours at this temperature and then allowed to come to room temperature by standing overnight. The reaction mixture was diluted with the addition of 1500 ml. each of ether and water and was made slightly basic with cooling by the addition of potassium carbonate. The ether phase was washed twice with dilute potassium carbonate solution and twice with water. The ether was dried over sodium sulfate and concentrated to dryness in vacuo. The resulting foam was taken up in 100 ml. of carbon tetrachloride, treated with 7.0 g. of N-bromo succinimide and 40 mg. of 2',2-aza bisisobutyronitrile and heated at reflux under argon for one hour. After cooling the solution fas filtered and the filtrate concentrated to dryness in vacuo. The residue was treated with 100 ml. of acetone and 12 g. of sodium iodide and heated at reflux with stirring under argon for 4 hours. Thereafter the volume was reduced to about 60 ml. and after cooling it was treated with 400 ml. of chloroform. The organic phase was washed with dilute sodium thiosulfate until the solution was iodine free. The organic solvent was then washed twice with water, dried over sodium sulfate and concentrated in vacuo. The residue was dissolved in benzene and chromatographed over 120 g. of Alox (neutral, Act. II). It was washed first with a mixture of hexane/benezene and benzene. The pure 3β-acetoxy-18-(methyl-2'-acetoxy-ethyl-amino)-5,14,16-pregnatrien-20-one was eluted with benzene/ethyl acetate mixture (8:1 to 2:1).

(B) 3α,11α-diacetoxy-5β-pregnan-20β-01(K. Heusler et al. Helv. 44, 502 (1961)) was in an analogous manner to that described under A. above converted into 3a,11α-diacetoxy - 18-(methyl-2'-acetoxyethylamino)-5β-pregna-14,16-dien-20-one.

(C) 3β-acetoxy-5α-pregn-7-en-20-one (C. Djerassi et al., J. Org. Chem. 16, 754 (1951) was reduced with lithium-tri-t-butoxy aluminum hydride and tetrahydrofuran to the 20-hydroxy compound which was then converted to the 20-nitrite and finally into the 18-oxime. By reduction ofthe oxime to the amine, reacting that with ethylenechlorohydrin and saponifying the 3-acetate one obtains 18-(2'-hydroxyethylamino)-5α-pregn-7-en-3β,20α (and 20β)-diol.

A solution of 11.31 g. (30 mol.) of 18-(2'-hydroxyethyl-amino)-5α-pregn-7-en-3β,20α (and 20β)-diol in 45 ml. of pyridine was stirred with an excess of 2',2',2'-trichloro-ethoxycarbonyl chloride for 12 hours at 15° C. The reaction mixture was added with vigorous stirring to 600 ml of ice water. The precipitate was filtered off and washed with water, dried and taken up in 360 ml. of glacial acetic acid/carbon tetrachloride (1:2). The mixture was stirred at 0° C. and during a period of 30 minutes was treated with 260 ml. of a tertiary butyl chromate solution which was prepared from 75 ml. of tertiary butanol, 225 ml. of carbon tetrachloride and 40 g. of chromium trioxide just prior to use. The reaction was continued for 6 hours at 0° C. and then allowed to stand for 24 hours at room temperature with stirring. The reaction mixture was diluted with carbon tetrachloride and washed 8 times with water. After drying over magnesium sulfate it was concentrated in vacuo. The resulting oil was dissolved in a small amount of benzene/ether (10:1) and freed of polar side products by filtering through a column of 45 g. of Alox (neutral Act. I→II). The mixture of 7-keto-8α, 9α and 8α, 14α-oxide was dissolved in benzene and was separated in a column of 300 g. of Florisil with the aid of a fraction collector. Elution was obtained with benzene nad benzene/isopropyl ether mixture (the composition of the mixture being continuously changed from 10:1 to about 1:3. Initially eluted was the 7-keto-8,9-oxide followed by the desired 3,20-(2',2',2'-trichloroethoxy carbonyloxy ethyl-2',2',2'-trichloroethoxy carbonylamino)-8,14-epoxy-5α,8α pregnan-7-one. The latter was dissolved in 45 ml. of glacial acetic acid and treated with 1400 mg. of zinc powder. The suspension was heated at reflux under argon with stirring. After cooling the zinc powder was centrifuged off, the remaining solution treated with 500 ml. water and 600 ml. of chloromethane and made slightly basic with potassium carbonate. The organic phase was separated and washed with water several times. The organic phase was then dried over magnesium sulfate and concentrated in vacuo to dryness. The obtained crude 3β,20α(and 20β)-di-hydroxy - 18-(2'-hydroxyethylamino)-5α-pregn-8,(14)-en-7-one was directly employed in the cyclization reaction.

(D) The reaction of 20-hydroxy-4,6-pregnadien-3-one (F. Sondheimer et al., J. Am. Chem. Soc. 75, 5932 (1953)) with isopropenyl acetate and the following partial saponification with sodium bicarbonate in methanol leads to 20-acetoxy-4,7-pregnadien-3-one, which upon hydrogenation with 10 per cent palladium on charcoal loses the $\Delta^4$-double bond.

The saponification with potassium carbonate in anhydrous methanol under reflux yields 20-hydroxy-5β-pregn-7-en-3-one, which is then treated with nitrosyl chloride in pyridine. The irradiation of the obtained 20-nitrite ester and reduction with hydrogen/Raney-nickel yields the 18-amino derivative. Upon extended boiling of the amine in acetone with 2-chloroethanol and in the presence of potassium carbonate one obtains 20-hydroxy-18-(2'-hydroxyethyl-amino)-5β-pregn-7-en-3one.

20α - (and 20β)-hydroxy-18-(2'-hydroxyethyl-amino)-5β-pregn-7-en-3-one in 45 ml. of pyridine was stirred for 18 hours at room temperature with an excess of 2,2,2-trichloroethoxy carbonyl chloride. The reaction mixture was thrown quickly into 750 ml. ofice water with strong stirring. The precipitate was filtered off, washed with additional water and quickly washed with a small amount of very cold absolute ether. The dried product, 20α-(and 20β)-(2',2',2'-trichloroethylcarbonyloxy)-18-(2',2',2'- trichloroethyoxycarbonyloxyethyl - 2',2',2'-trichloroethoxy-carbonyl-amino)-5β-pregn-7-en-3-one can directly be used in the butyl chromate oxidation which has been described under C.

(E) 3α-Acetoxy-5β-pregnan-20β-ol (K. B. Turner et al. Am. Soc. 73, 2283, (1951)) was converted in analogous manner to that described under A above into 3α-acetoxy-18 - (methyl-2' - hydroxyethylamino) - 5β-pregna-14,16-dien-20-one.

800 mg. of 3α-acetoxy-18-(methyl-2'-hydroxyethyl-amino)-5β-pregna-14,16-dien-20-one was converted into the 14,15β-epoxide by treatment with m-chloro-perbenzoic acid in t-butanol, (UV: $\epsilon_{238}$=8,300 in methanol). Upon treatment with hydrogen bromide in chloroform one obtains the 14β-hydroxy-15-bromo derivative (UV: $\epsilon_{241}$=8,000 in methanol) which may then be hydrogenated in tetrahydrofuran/methanol (1:1) with palladium/calcium carbonate (10 percent) in the presence of sodium acetate/acetic acid to yield 14-hydroxy-3α-acetoxy-18-(methyl-2'-hydroxyethylamino)-5β,14β-pregnan - 20 - one as a crude product.

(F) 3,3-ethylenedioxy - 5 - pregnen-20β-ol [Cainelle, Helv. 44, 518 (1961)] was reacted with nitrosyl chloride in pyridine to yield the 20-nitrite which was photochemically converted into the 18-oxime. The oxime was reduced to the amine, reacted with ethylene chlorohydrin and N-methylated with methyl iodide to yield 3,3-ethylenedioxy-18-(methyl-2'-hydroxyethyl - amino)-5-pregnen-20β-ol. Oppenauer oxidation of the 20-hydroxyl group, cleavage of the 3-ketal and introduction of a 14α-hydroxyl group with *Curvularia lunata* yielded 14α-hydroxy-18-(methyl-2'-hydroxyethyl-amino)-4-pregnen-3,20-dione.

(G) 3,3-ethylenedioxy - 18 - (methyl-2'-hydroxyethyl-amino)-5-pregnen-20β-ol (prepared as in F above) was after Oppenauer oxidation of the 20-hydroxyl group and cleavage of the ketal, dehydrated with chlorenil in t-butanol to give 18-(methyl-2'-hydroxyethyl-amino)-pregna-4,6-dien-3,20-dione. Reaction with isopropenyl acetate and careful saponification yields 18-(methyl-2'-acetoxy ethylamino)-pregna-4,7-dien-3,20-dione which after hydrogenation of the $\Delta^4$ double bond with hydrogen and ketalization with simultaneous shift of the $\Delta^7$-double bond into the 8-(14)-position yields 3,20-bisethylenedioxy-18-(methyl-2'-acetoxyethyl-amino)-pregn-8(14)-ene. Saponification with sodium bicarbonate in methanol and bromination with N-bromo succinimide in carbon tetrachloride yields 7 - bromo - 3,20 - bisethylenedioxy-18-(methyl-2'-hydroxyethyl-amino)-pregn-8(14)-ene.

(H) 3,3-ethylenedioxy - 18 - (methyl-2'-hydroxyethyl-amino)-pregn-5-en-20-one (prepared by procedure F) was treated with acetic anhydride/pyridine then with ethylene glycol/paratoluene sulfonic acid to yield the 3,20-bisketal. Bromination with N-bromo-succinimide, dehydrobromination by cooking with collidine, catalytic hydrogenation of the $\Delta^5$-double bond with hydrogen over Raney-Nickel catalyst in ether-methanol, treatment with selenium dioxide in benzene with additional acetic acid gave after partial saponification with sodium bicarbonate in methanol, 3,20-bisethylenedioxy-7-acetoxy-18-(methyl-2'-hydroxyethyl-amino)-pregn-8(14)-ene.

The following examples are given for the purpose of further illustrating the present invention and are not to be considered limitative of the scope of such invention.

EXAMPLE 1

A total of 940 mg. (2 mmol) of 3$\beta$-acetoxy-18-(methyl-2'-acetoxy-ethylamino)-5,14,16 - pregnatrien-20-one was dissolved in 30 ml. of anhydrous dioxane under nitrogen and after the addition of 225 mg. of powdered potassium hydroxide was heated to 45–55° C. The reaction was followed with the help of thin-layer chromatography (Alox-plate; solvent system: benzene/ethyl acetate/chloroform=10:7:1). For workup the cooled solution was treated with 300 ml. of dichloromethane and washed five times with water. The organic phase was dried over magnesium sulfate and concentrated to dryness in vacuo (bath temperature about 30° C.). The oily residue was dissolved in a minimum of dichloromethane and placed on a column of 25 g. of Alox (neutral Act II–III). The column was first washed well with benzene. The pure 3$\beta$-hydroxy-N-methyl-18-nor-14$\beta$-pregna - 5,16 - dieno[13,14-f]-hexahydro-1,4-oxazpin-20-one was eluted with benzene/ether/methylene chloride mixture. UV: $\epsilon_{240}=7,800$.

EXAMPLE 2

3$\alpha$,11$\alpha$-diacetoxy-18-(methyl-2'-acetoxyethyl - amino)-5$\beta$-pregna-14,16-dien-20-one was cyclized in analogous fashion as in Example 1. The crude cyclization product was chromatographed on Alox and converted into the perchlorate (ether, 70 percent perchloric acid, —15° C.) for purification. The free amine was obtained as follows: The perchlorate (265 mg.) was taken up in 15 ml. of 5 percent potassium carbonate solution. After addition of 25 ml. of dichloromethane the two-phase mixture was stirred for two hours at 0° C. under nitrogen. The organic phase was separated, washed twice with 1 percent potassium carbonate solution, dried over sodium sulfate and concentrated to dryness in vacuo at 20° C. so as to yield 3$\alpha$,11$\alpha$-dihydroxy-N-methyl-18-nor-5$\beta$,14$\beta$ - pregn-16-eno-[13,14-f]-hexahydro-1,4-oxazepin - 20 - one in pure form. UV: $\epsilon_{241}=7,300$.

EXAMPLE 3

A solution containing 782 mg. (2 mmol) of 3$\beta$,20$\alpha$ (and 20$\beta$) - dihydroxy-18-(2'-hydroxyethyl-amino)-5$\alpha$-pregn-8(14)-en-7-one in 30 ml. of tertiary butanol was treated with 300 mg. of powdered potassium hydroxide and heated to 35° C. under argon for one and ¾ hour. For workup the cooled solution was diluted with 400 ml. of ether/dichloromethane (5:1) and washed several times with 5 percent sodium chloride solution. The dried (magnesium sulfate) organic phase was concentrated in vacuo. The residue was dissolved in benzene and purified by chromatography on 20 g. of Alox (neutral Act. III) to yield pure 3$\beta$,20$\alpha$(and 20$\beta$)-dihydroxy-18-nor-5$\alpha$,14$\beta$-pregnano-[13,14-f]hexahydro - 1,4 - oxazepin-7-one.

EXAMPLE 4

A solution containing 1.173 g. (3 mmol) of 3$\beta$,20$\alpha$ (and 20$\beta$)-dihydroxy - 18 - (2'-hydroxyethylamino)-5$\alpha$-pregn-8(14)-en-7-one in 50 ml. of isopropanol and 50 ml. of piperidine was heated under argon until reflux. The reaction solution was stirred overnight at room temperature than was added to a 5 percent sodium chloride solution and extracted with ether/dichloromethane (5:1). The further workup was in accordance with Example 3. In this manner was obtained the same final product as in Example 3.

EXAMPLE 5

In analogous manner to Example 3$\beta$,20$\alpha$(and 20$\beta$)-(2',2',2' - trichloroethylcarbonyloxy) - 18 - (2',2',2'-trichloroethoxycarbonyloxyethyl - 2',2',2' - trichloroethoxycarbonyl-amino)-5$\beta$-pregn-8-(14)-en-3,7-dione was converted into 20$\alpha$(and 20$\beta$)-hydroxy-18-nor-5$\beta$,14$\beta$-pregnano-[13,14-f]-hexahydro-1,4-oxazepin-3,7-dione.

EXAMPLE 6

14-hydroxy-3$\alpha$-acetoxy - 18 - (methyl-2'-hydroxyethyl-amino)-5$\beta$,14$\beta$-pregnan-20-one was dissolved in 5 ml. of absolute pyridine, treated with 1 ml. of methanesulfonyl chloride and the solution allowed to stand for 24 hours at room temperature. The solution was taken to dryness utilizing an oil pump vacuum and the residue was chromatographed on 100 g. of basic aluminum oxide (III) with methylene chloride. In this manner one obtains 3$\alpha$-acetoxy - N-methyl-18-nor-5$\beta$,14$\beta$-pregnano - [13,14-f]-hexahydro-1,4-oxazepin-20-one- as an oil.

EXAMPLE 7

A total of 432 mg. of 3$\alpha$-acetoxy-N-methyl-18-nor-5$\beta$,14$\beta$-pregnano - [13,14-f] - hexahydro - 1,4 - oxazepin-20-one together with 446 mg. of cupric bromide in 20 ml. of tetrahydrofuran was heated at reflux for two hours. The reaction product was added to ice water containing some ammonia, taken up in ether and the organic phase washed with base and dried over sodium sulfate. After distillation of the solvent there is obtained a yellow oil. The oil, 17-bromo - 3$\alpha$ - acetoxy-N-methyl - 18 - nor-5$\beta$,14$\beta$-pregnano-[13,14-f]-1,4-oxazepin-20-one was dissolved in 10 ml. of dimethyl formamide and together with 500 mg. of lithium carbonate and 500 mg. of lithium bromide was heated for 16 hours under nitrogen at 110 °C. The mixture was added to ice water, taken up in ether, the ether solution was washed with water and dried over sodium sulfate. After disillation of the solvent and chromatography over aluminum oxide there was obtained 3$\alpha$-hydroxy - N - methyl-18-nor-5$\beta$-14$\beta$-pregn-16-eno-[13,14 - f] - hexahydro - 1,4 - oxazepin - 20 - one. UV: $\epsilon_{240}=8000$.

EXAMPLE 8

A total of 100 mg. of 3$\alpha$-hydroxy-N-methyl-18-nor-5$\beta$,14$\beta$ - pregn-16-eno-[13,14-f]-hexahydro-1,4-ozazepin-20-one in 10 ml. of methanol containing 3 ml. of water was reduced utilizing 40 mg. of sodium borohydride for 30 minutes at room temperature. The reaction product was precipitated with ice water, taken up in ether and the ether solution washed with water and drived over sodium sulfate. After concentration of the solvent there was obtained 3$\alpha$,20$\alpha$-dihydroxy-N-methyl-18-nor-5$\beta$,14$\beta$-pregn-16-eno-[13,14-f]-hexahydro-1,4-oxazepin.

EXAMPLE 9

A total of 366 mg. of 14-hydroxy-18-(methyl-2'-hydroxyethylamino)-4-pregnen-3,20-dione was dissolved in 20 ml. of ethylene chloride and together with 0.2 ml. of 70 percent perchloric acid was heated 1 hour under reflux. The reaction mixture was diluted with methylene chloride, washed with water until neutral, dried over sodium sulfate and concentrated in vacuum. There was thus obtained N - methyl-18-nor-14β-pregn-4-eno-[13,14-f]-hexahydro - 1,4 - oxazepin-3,20-dione as an oil. UV: $\epsilon_{239} = 16,100$.

EXAMPLE 10

A total of 250 mg. of 7-bromo-3,20-bis-ethylenedioxy-18-(methyl-2'-hydroxyethyl-amino)-pregn-8(14)-ene was dissolved in 20 ml. of acetone and 1 ml. of water and together with 200 mg. of freshly prepared silver oxide was allowed to stand 12 hours at 40–45° C. in the dark. The solution was freed of solid by filtration and after removal of solvent, the resulting oil was purified by filtering through kieselgel. There was thus obtained pure 3,20-bis - ethylenedioxy - N - methyl-18-nor-5β,14β-pregn-7-eno-[13,14-f]-hexahydro-1,4-oxazepin as an oil. The free 3,20-dioxo compound was obtained by cooking the above compound in anhydrous acetone in the presence of catalytic amounts of 10 percent sulfuric acid.

EXAMPLE 11

A total of 1.12 g. of 3,20-bis-ethylenedioxy-7-acetoxy-18-(methyl - 2' - hydroxy - ethylamino)pregn-8(14)-ene in 10 ml. of absolute dimethylsulfoxide was with stirring and ice cooling added over a period of five minutes to a solution of 390 mg. of resublimed potassium t-butylate in 15 ml. of absolute dimethyl sulfoxide. After the addition the mixture was stirred for an additional 20 minutes with cooling and then heated to 60° C. for 4 hours. After cooling it was added to 100 ml. of half-saturated sodium chloride solution and extracted with ether. There was thus obtained 3,20-bis-ethylenedioxy-N-methyl-18-nor-5α,14β-pregn-7-eno-[13,14-f]-hexahydro-1,4-oxazepin whose IR spectrum exhibited an absence of OH= and acetate bands. The free 3,20-dioxo compound was obtained by cooking the above in anhydrous acetone in the presence of catalytic amounts of 10 percent sulfuric acid.

We claim:
1. A compound of the formula

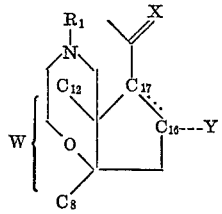

wherein X is a keto group or

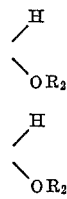

has the α- or β-configuration and $R_2$ is hydrogen, acyl having from 1 to 11 carbon atoms, or tetrahydropyranyl, $R_1$ is hydrogen, alkyl having from 1 to 7 carbon atoms, alkenyl selected from the group consisting of propenyl, isopropenyl, methallyl and vinyl, ethynyl or acyl having from 1 to 11 carbon atoms, $C_{16} \ldots C_{17}$ represents a saturated or unsaturated carbon-carbon bond, Y is hydrogen, alkyl having from 1 to 7 carbon atoms, or —$OR_3$ wherein $R_3$ is hydrogen, acyl having from 1 to 11 carbon atoms, alkyl having from 1 to 7 carbon atoms, or tetrahydropyranyl, W is a group of the formula

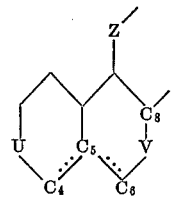

wherein U is the group

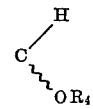

where —$OR_4$ has the α- or β-configuration and $R_4$ is hydrogen, acyl having from 1 to 11 carbon atoms, alkyl having from 1 to 7 carbon atoms or tetrahydropyranyl or alternatively U may be C=O wherein the keto group may be in the ketal form, $C_4 \ldots C_5$ as well as $C_5 \ldots C_6$ are saturated or unsaturated carbon-carbon bonds in the indicated positions, $V \ldots C_8$ is selected from one of the following groups

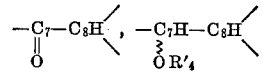

(where $OR'_4$ has the same meaning as —$OR_4$) or —$C_7=C_8<$, and Z is the group

(wherein —$OR_5$ is α- or β- in configuration and $R_5$ is hydrogen or acyl having from 1 to 11 carbon atoms) or C=O and the hydrogen atom in the 5-position is in the α- or β-configuration, and the ammonium salts thereof.

2. The compounds of claim 1 wherein $R_1$ is hydrogen.

3. The compound of claim 2 which is 3β,20α-(and 20β)-dihydroxy-18-nor-5α-14β-pregnano- [13,14-f]-hexahydro-1,4-oxazepin-3,7-dione.

4. The compound of claim 2 which is 20α (and 20β)- hydroxy - 18 - nor - 5β,14β - pregnano - [13,14-f] - hexahydro-1,4-oxazepin-3,7-dione.

5. The compounds of claim 1 wherein $R_1$ is alkyl.

6. The compound of claim 5 is 3β-hydroxy-N-methyl-18 - nor - 14β - pregna - 5,16 - dieno - [13,14-f] - hexahydro-1,4-oxazepin-20-one.

7. The compound of claim 5 which is 3α,11α-dihydroxy-N - methyl - methyl - 18 - nor - 5β,14β - pregn - 16- -eno - [13,14-f]-hexahydro-1,4-oxazepin-20-one.

8. The compound of claim 5 which is 3α,11α-dihydroxy - N - methyl - 18 - nor - 5β - pregn - 16 - eno - [13,14-f]-hexahydro-1,4-oxazepin-20-one perchlorate.

9. The compound of claim 5 which is 3α-acetoxy-N-methyl - 18 - nor - 5β,14β - pregnano - [13,14-f] - hexahydro-1,4-oxazepin-20-one.

10. The compound of claim 5 which is 3α-acetoxy-N-methyl - 18 - nor - 5β,14β - 17 - bromo - pregnano - [13,14-f]-hexahydro-1,4-oxazepin-20-one.

11. The compound of claim 5 is 3α-hydroxy-N-methyl-18 - nor - 5β,14β - pregn - 16 - eno - [13,14-f] - hexadro - 1,4-oxazepin-20-one.

12. The compound of claim 5 which is 3α,20α-dihydroxy - N - methyl - 18 - nor - 5β,14β - pregn - 16 - eno - [13,14-f]-hexahydro-1,4-oxazepine.

13. The compound of claim 5 which is N-methyl-18-nor-14β-pregn-4-eno[13,14-f]-hexahydro - 1,4 - oxazepin-3,20-dione.

14. The compound of claim 5 which is 3,20-bisethylenedioxy - N - methyl - 18 - nor - 5β,14β - pregn - 7 - eno - [13,14-f]-hexahydro-1,4-oxazepine.

15. The compound of claim 5 which is 3,20-bisethylenedioxy - N - methyl - 18 - nor - 5α,14β - pregn - 7 - eno-[13,14-f]-hexahydro-1,4-oxazepine.

16. The compound of claim 5 which is N-methyl-18-nor - 5α,14β - pregn - 7 - eno - [13,14-f] - hexahydro-1,4-oxazepin-3,20-dione.

17. The compound of claim 5 which is N-methyl-18-nor - 5β,14β - pregn - 7 - eno - [13,14-f] - hexahydro - 1,4-oxazepin-3,20-dione.

18. A compound of the formula

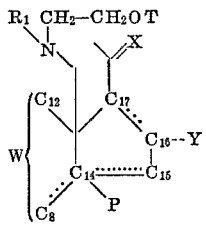

II wherein X is a keto group or

wherein

has the α- or β-configuration and $R_2$ is hydrogen, acyl having from 1 to 11 carbon atoms, alkyl having from 1 to 7 carbon atoms or tetrahydropyranyl, $R_1$ is hydrogen, alkyl having from 1 to 7 carbon atoms, alkenyl selected from the group consisting of propenyl, isopropenyl, methallyl and vinyl, ethynyl or acyl having from 1 to 11 carbon atoms, $C_{16} \ldots C_{17}$ represents a saturated or unsaturated carbon-carbon bond, Y is hydrogen, alkyl having from 1 to 7 carbon atoms, or —$OR_3$ wherein $R_3$ is hydrogen, acyl having from 1 to 11 carbon atoms, alkyl having from 1 to 7 carbon atoms, or tetrahydropyranyl, W is a group of the formula

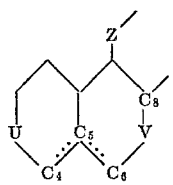

α- or β-configuration, wherein U is the group where —$OR_4$ has the α- or β-configuration and $R_4$ is hydrogen, acyl having from 1 to 11 carbon atoms, alkyl having from 1 to 7 carbon atoms or tetrahydropyranyl or alternatively U may be C=O wherein the keto group may be in the ketal form, $C_4 \ldots C_4$ as well as $C_5 \ldots C_6$ are saturated or unsaturated carbon-carbon bonds in the indicated positions, $V \ldots C_8$ is selected from one of the following groups

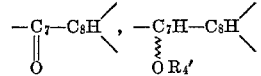

(where $OR'_4$ has the same meaning as —$OR_4$) or —$C_7=C_8<$, and Z is the group

(wherein —$OR_5$ is α- or β- in configuration and $R_5$ is hydrogen or acyl having from 1 to 11 carbon atoms) or C=O and the hydrogen atom in the 5-position is in the α- or β-configuration and T is hydrogen, acyl having from 1 to 11 carbon atoms, methyl sulfonyl, p-tolylsulfonyl or tetrahydropyranyl and when $C_8 \ldots C_{14} \ldots C_{15}$ are saturated carbon-carbon bonds, P is an α- or β-hydroxyl group.

19. The compound of claim 18 which is 3β-acetoxy-18-(methyl-2'-acetoxyethylamino)-pregna-5,16 - dien-20-one.

20. The compound of claim 18 which is 3β-acetoxy-18-methyl-2'-acetoxyethylamino) - 5,14,16 - pregnatrien-20-one.

21. The compound of claim 18 which is 3α,11α-diacetoxy-18-(methyl-2'-acetoxyethylamino) - 5β - pregna-14,16-dien-20-one.

22. The compound of claim 18 which is 3β,20α(or 20β)-dihydroxy-18-(2'-hydroxyethylamino) - 5α - pregn-8-(14)-en-7-one.

23. The compound of claim 18 which is 20α-(or 20β)-hydroxy-18-methyl-(2'-hydroxyethylamino) - 5β - pregn-8-(14)-en-3,7-dione.

24. The compound of claim 18 which is 14-hydroxy-3α-acetoxy-18-(methyl-2' - hydroxyethylamino) - 5β,14β-pregnan-20-one.

25. The compound of claim 18 which is 14-hydroxy-18-(methyl-2'-hydroxyethylamino)14-pregnen-3,20-dione.

26. The compound of claim 18 which is 18-(methyl-2'-acetoxyethylamino)-pregna-4,7-dien-3,20-dione.

27. 7-bromo-3,20-bis-ethylenedioxy - 18 - (methyl-2'-hydroxyethylamino)-pregn-8(14)-ene.

28. The compound of claim 18 which is 3,20-(bis-ethylenedioxy)-7-acetoxy-18-(methyl - 2' - hydroxyethylamino)-pregn-8(14)-ene.

References Cited
UNITED STATES PATENTS

| | | |
|---|---|---|
| 2,913,455 | 11/1959 | Pappo. |
| 2,933,511 | 4/1960 | Laos et al. |
| 3,033,871 | 5/1962 | Jeger. |

HENRY A. FRENCH, Primary Examiner

U.S. Cl. X.R.

260—397.4, 397.45, 397.5, 999

UNITED STATES PATENT OFFICE
CERTIFICATE OF CORRECTION

Patent No. 3,578,659      Dated May 11, 1971

Inventor(s) Berndt, Buchschacher, Eder, Furlenmeier, Furst, Kerb, Muller and Wiechert It is certified that error appears in the above-identified patent and that said Letters Patent are hereby corrected as shown below:

Column 13, line 61 of Claim 1

"
H            H
$OR_2$         $OR_2$
"

should be

H            H
$OR_2$    wherein    $OR_2$

Column 14, line 44 of Claim 3

"oxazepin 3,7-dione"

should be oxazepin-7-one

Column 14, line 55 of Claim 8

"18-nor 5β-pregn"

should be 18-nor-5β,14β-pregn

UNITED STATES PATENT OFFICE
CERTIFICATE OF CORRECTION

PO-1050
(5/69)

Patent No. 3,578,659                Dated _____

Inventor(s) _____

It is certified that error appears in the above-identified patent and that said Letters Patent are hereby corrected as shown below:

Column 15, line 54 of Claim 18

"U is the group where ——$OR_4$"

should be

U is the group $C\begin{smallmatrix}H\\OR_4\end{smallmatrix}$

Signed and sealed this 25th day of January 1972.

(SEAL)
Attest:

EDWARD M. FLETCHER, JR.
Attesting Officer

ROBERT GOTTSCHALK
Commissioner of Patents